US006820024B2

(12) United States Patent
Fukumoto

(10) Patent No.: US 6,820,024 B2
(45) Date of Patent: Nov. 16, 2004

(54) SYSTEM AND METHOD FOR CALIBRATING CONTROL UNIT

(75) Inventor: Takafumi Fukumoto, Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 153 days.

(21) Appl. No.: 09/955,031

(22) Filed: Sep. 19, 2001

(65) Prior Publication Data
US 2002/0035440 A1 Mar. 21, 2002

(30) Foreign Application Priority Data

Sep. 20, 2000 (JP) ........................................ 2000-284814

(51) Int. Cl.[7] ................................................ G06F 9/00
(52) U.S. Cl. ...................... 702/85; 702/152; 700/113; 701/115; 717/100; 717/101
(58) Field of Search .................. 702/85, 152; 717/100, 717/101, 115, 107, 104; 700/115, 113; 701/24, 29, 32, 35, 36, 115

(56) References Cited

U.S. PATENT DOCUMENTS

| 5,812,849 A | * | 9/1998 | Nykiel et al. ................ 717/101 |
| 6,167,319 A | * | 12/2000 | Harris et al. ................... 700/86 |
| 6,505,341 B1 | * | 1/2003 | Harris et al. ................. 717/100 |
| 6,550,052 B1 | * | 4/2003 | Joyce et al. ................. 717/107 |

FOREIGN PATENT DOCUMENTS

JP           05-282141        10/1993

* cited by examiner

Primary Examiner—John Barlow
Assistant Examiner—Hien Vo
(74) Attorney, Agent, or Firm—McDermott Will & Emery LLP

(57) ABSTRACT

Source files are added in advance with data specification information necessary for conversion of the source files into a calibrating file, the source files are converted into a calibrating file, and calibration is performed based on the post-converted calibrating file.

15 Claims, 1 Drawing Sheet

SYSTEM AND METHOD FOR CALIBRATING CONTROL UNIT

FIELD OF THE INVENTION

The present invention relates to a system and a method for calibrating source files necessary to operate a control unit for controlling an engine or an automatic transmission of a vehicle.

DESCRIPTION OF THE RELATED ART

Heretofore, a system for calibration by a software processing has been used in developing a control unit for controlling an engine or an automatic transmission of a vehicle.

More specifically, an original ROM-made file (hexadecimal Hex file), and a program file, a data source file and a map file used to create the ROM-made file are prepared as source files.

Further, there is prepared a specification file in which various specifications such as the number of bytes, bit rate, units, setting range and the like of each data in the data source file are described in the general spreadsheet software. This specification file is read in by a creation command of a calibrating file, so as to create a standardized calibrating file.

Then, the calibrating file is read into the calibration software, so that a calibration result can be obtained as a hexadecimal Hex file.

According to the above-mentioned conventional calibration system, it is necessary to prepare a specification file in which specifications are described in the general spreadsheet software, in addition to the program file, the data source file and the map file which are the source files used to create the ROM-made file.

Therefore, it is necessary to update the data specification file to correspond to a change in specification such as data structure/resolution due to control modification, or the addition of data, so that the ROM information coincides with the specification information. Such version management becomes an overburden. Moreover, in order to automate the version management, it is necessary to newly create a large information management tool.

Further, in the conventional calibration system, since the general spreadsheet software is utilized, there is a possibility that, due to the different versions of the spreadsheet software, the creating function of the calibrating file cannot be used.

Moreover, according to the conventional system, the calibration result is obtained as a hexadecimal (Hex) file, requiring some kind of incidental operation to be performed in order to reflect the calibration result to the source file. Therefore, the conventional system is not completed as a single system, resulting in the difficulty of utilization.

SUMMARY OF THE INVENTION

Therefore, the present invention aims at providing a calibration system and a calibration method enabling to reflect reliably a change in data structure/resolution due to control modification or the addition of data to the data specification information, and to relieve an overload due to version management.

Moreover, the present invention aims at providing a calibration system and a calibration method enabling to output a calibration result as source files, to achieve the high usability of the calibration result.

In order to achieve the above objects, according to the present invention, in a construction that source files necessary to operate a control unit is converted into a calibrating file to perform calibration based on the post-converted calibrating file, data specification information required for the conversion into a calibrating file is added to the source files in advance.

The other objects and features of this invention will become understood from the following description with reference to the accompanying drawing.

DETAILED DESCRIPTION OF THE PREFERRED EMBODIMENT

Figure 1:
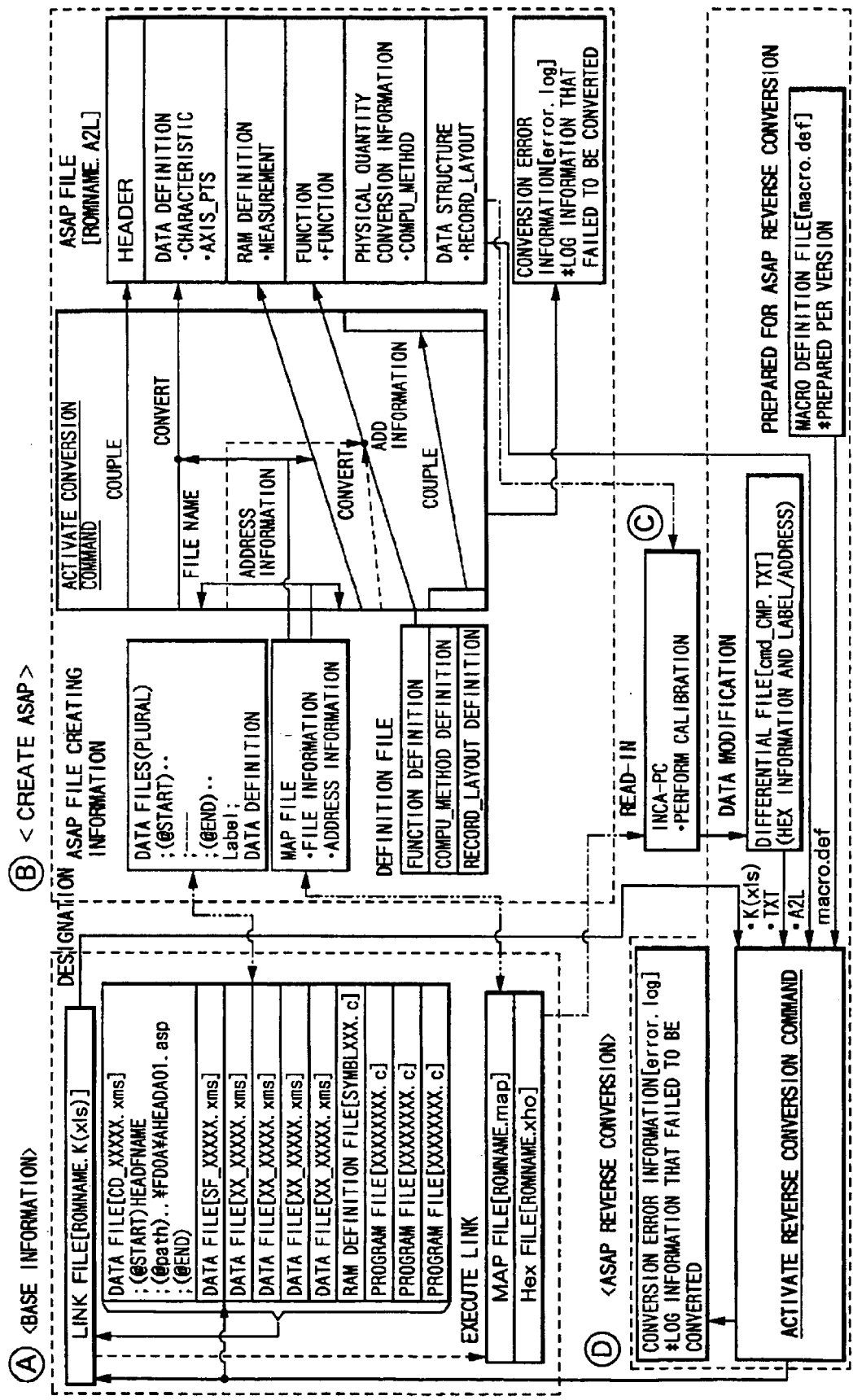
FIG. 1 is a block diagram showing a calibration system according to the present invention.

A calibration system shown in FIG. 1 is a system for calibrating source files required to operate a control unit for controlling, for example, an engine or an automatic transmission of a vehicle.

In the present embodiment, the source files required to operate the control unit are converted into a standardized calibrating file to perform the calibration. Here, the present embodiment follows the standard of ASAP (Application Systems Standardization Working Group) instituted mainly of car manufacturers in Germany, and the standardized calibrating file is hereinafter called the ASAP file, and the information required to create the ASAP file is hereinafter called the ASAP information.

In FIG. 1, base information A includes an original ROM-made file (hexadecimal Hex file), and a program file, a data file and a map file as source files utilized to create the ROM-made file.

Data specification information equivalent to the above-mentioned ASAP information is directly described in the above data file, but other than that, the files necessary for ordinary operation are used as they are.

The data specification information is the information representing data structure/resolution such as the number of bytes, bit rate, units, setting range and the like. The information is unnecessary as source files for operating the control unit, but is necessary for creating the ASAP file. In the present embodiment, such ASAP information is directly described in the data file, and not stored in a different file.

Moreover, the base information A includes a link file for defining the selection of individual data and programs.

On the other hand, in an ASAP creating unit B, fixed ASAP information independent of a difference in ROM data is prepared in advance as a definition file (text file). The ASAP creating unit B collects, by a conversion command, necessary information, such as, the data file, the map file and the like, of the base information A to create the ASAP file including the data definition, function, physical quantity conversion information, data structure and the like.

When a description error occurs during the creation of the ASAP file (the conversion of the source files into the ASAP file), conversion time error information is output as log information of conversion fail.

The original ROM-made file included in the base information A and the ASAP file is read into a calibration software C (INCA-PC in FIG. 1), where the calibration is performed.

A calibration result from the calibration software C is output to an ASAP reverse conversion unit D.

In the ASAP reverse conversion unit D, data of the calibration result is modified to a differential file being a text file comprised of hexadecimal information and label/address.

Further, a macro definition file for reverse conversion of ASAP is stored in the ASAP reverse conversion unit D in advance.

With the differential file, the macro definition file, the ASAP file and base information as origins, an ASAP reverse conversion command is activated, to output the calibration result as a new data file and a new link file.

More specifically, as a result of the calibration, a keyword of the file in which differential data has been generated is output from the ASAP file, and based on this keyword, information on the file to be modified is searched from the link file included in the base information. Based on the information on the file to be modified and the differential data, a new data file and a new link file are created.

Further, in the reverse conversion of the calibration result into the source files, log information of reverse conversion fail is output as reverse conversion time error information.

According to the calibration system with the above construction, the data specification information being the ASAP information is added to the source files and also directly described in the data file of the source files, so there is no need of version management as in the case where the data specification information being the ASAP information is described in a separate file by the general spreadsheet software, so that the addition or update of the data specification information being the ASAP information can be performed simultaneously with the control modification.

Accordingly, at the time of control modification, the addition or update of the data specification information can be reflected on the ASAP information without fail, so the ASAP file is accurately created based on the correct ASAP information.

Moreover, since the ASAP creating unit B includes in advance the fixed ASAP information independent of the difference in ROM data as the definition file, so the expansion or utilization to other control units can easily be made.

Further, in creating the ASAP file, since the selection information is only the base information and the definition file, the operation can easily be made.

Even further, since the calibration result is reverse-converted to be output to a new data file and a new link file, calibrated source files can be obtained without the necessity to perform any incidental operation, so a specification order for the control unit and the like can be performed easily.

Moreover, when a conversion error occurs either during the conversion into the ASAP file or during the reverse conversion of the calibration result, since error information is output, the description or operation errors can be easily analyzed.

The original data definition may not be in the form of data file. For example, if the original data is described in the file of the general spreadsheet software, the data specification as the ASAP information may be described in the file of the general spreadsheet software.

The entire contents of Japanese Patent Application No. 2000-284814, filed Sep. 20, 2000 are incorporated herein by reference.

What is claimed:

1. A calibration system of a control unit, comprising:
   a conversion unit for converting source files into a calibrating file, said source files being necessary for operating the control unit and being added with data specification information required for said conversion into the calibrating file; and
   a calibration unit for performing calibration based on said calibrating file to output a calibration result; wherein
   said calibration unit comprises a reverse conversion unit for performing reverse conversion of said calibration result to output the same as source files.

2. A calibration system of a control unit according to claim 1,
   wherein, at said conversion unit, said data specification information is directly described in a data file among said source files.

3. A calibration system of a control unit according to claim 1,
   wherein said reverse conversion unit activates a reverse conversion command with said calibration result, a macro definition file for reverse conversion, said source files and said calibrating file as origins, and converts said calibration result into new source files to output the same.

4. A calibration system of a control unit according to claim 1,
   wherein said reverse conversion unit outputs information indicating that an abnormality occurred during the reverse conversion in a portion where said reverse conversion was not performed normally.

5. A calibration system of a control unit according to claim 1,
   wherein said reverse conversion unit converts said calibration result into a differential file.

6. A calibration system of a control unit according to claim 1,
   wherein when an abnormality occurs in the conversion into said calibrating file, said conversion unit outputs information indicating that an abnormality occurred during the conversion.

7. A calibration system of a control unit according to claim 1,
   wherein, at said conversion unit, the number of bytes, bit rate, units, and setting range are added to said source files as said data specification information.

8. A calibration system of a control unit, comprising:
   a conversion means for converting source files into a calibrating file, said source files being necessary for operating the control unit and being added with data specification information required for said conversion into the calibrating file;
   a calibration means for performing calibration based on said calibrating file to output a calibration result; and
   a reverse conversion means for performing reverse conversion of said calibration result to output the same as source files.

9. A method of calibrating a control unit, comprising the steps of:
   adding the data specification information required for conversion into a calibrating file to source files necessary for operating the control unit;
   converting said source files into a calibrating file;
   performing calibration based on said calibrating file to output a calibration result; and performing reverse conversion of said calibration result to output the same as source files.

10. A method of calibrating a control unit according to claim 9, wherein said step of adding data specification information comprises the step of;

describing said data specification information directly in a data file among said source files.

11. A method of calibrating a control unit according to claim 9, wherein said step of performing reverse conversion comprises the steps of:

activating a reverse conversion command with said calibration result, a macro definition file for reverse conversion, said source files and said calibrating file as origins; and converting said calibration result into new source files to output the same.

12. A method of calibrating a control unit according to claim 9, wherein said step of performing reverse conversion comprises the step of;

outputting information indicating that an abnormality occurred during the reverse conversion in a portion where said reverse conversion was not performed normally.

13. A method of calibrating a control unit according to claim 9, wherein said step of performing reverse conversion comprises the step of;

converting said calibration result into a differential file.

14. A method of calibrating a control unit according to claim 9, wherein said step of converting the source files into a calibrating file comprises the step of;

outputting information indicating that an abnormality occurred during the conversion when an abnormality occurs in the conversion into said calibrating file.

15. A method of calibrating a control unit according to claim 9, wherein, said step of adding the data specification information comprises the step of;

adding the number of bytes, bit rate, units, and setting range to said source files as said data specification information required for conversion into a calibrating file.

* * * * *